(12) United States Patent
Luzzi et al.

(10) Patent No.: US 7,761,714 B2
(45) Date of Patent: Jul. 20, 2010

(54) INTEGRATED CIRCUIT AND METHOD FOR PREVENTING AN UNAUTHORIZED ACCESS TO A DIGITAL VALUE

(75) Inventors: Raimondo Luzzi, Graz (AT); Marco Bucci, Graz (AT)

(73) Assignee: Infineon Technologies AG, Neubiberg (DE)

( * ) Notice: Subject to any disclaimer, the term of this patent is extended or adjusted under 35 U.S.C. 154(b) by 110 days.

(21) Appl. No.: 12/244,209

(22) Filed: Oct. 2, 2008

(65) Prior Publication Data

US 2010/0085075 A1 Apr. 8, 2010

(51) Int. Cl.
*G06F 21/00* (2006.01)

(52) U.S. Cl. .................. 713/182; 380/277; 380/44; 326/8; 726/26; 726/27

(58) Field of Classification Search ......... 713/182–186, 713/189; 380/277–286, 44–47; 726/1–21, 726/23, 25–33; 326/8
See application file for complete search history.

(56) References Cited

U.S. PATENT DOCUMENTS

| | | | | |
|---|---|---|---|---|
| 5,530,749 A * | 6/1996 | Easter et al. | | 713/191 |
| 5,530,753 A * | 6/1996 | Easter et al. | | 713/191 |
| 5,559,889 A * | 9/1996 | Easter et al. | | 380/30 |
| 6,826,663 B2 * | 11/2004 | Perego et al. | | 711/156 |
| 7,076,663 B2 * | 7/2006 | Kelley et al. | | 713/184 |
| 7,165,180 B1 * | 1/2007 | Ducharme | | 713/182 |
| 7,171,528 B2 * | 1/2007 | Evans et al. | | 711/156 |
| 7,240,218 B2 * | 7/2007 | Kean | | 713/193 |
| 7,386,732 B2 * | 6/2008 | Kelley et al. | | 713/184 |
| 7,442,583 B2 * | 10/2008 | Bonaccio et al. | | 438/130 |
| 7,457,960 B2 * | 11/2008 | Kablotsky, Joshua | | 713/176 |
| 7,461,268 B2 * | 12/2008 | Drehmel et al. | | 713/193 |
| 7,552,343 B2 * | 6/2009 | Desmicht et al. | | 713/189 |
| 7,596,812 B2 * | 9/2009 | Li et al. | | 726/26 |
| 2001/0037458 A1 * | 11/2001 | Kean | | 713/193 |
| 2002/0145931 A1 * | 10/2002 | Pitts | | 365/225.7 |
| 2003/0088779 A1 * | 5/2003 | Kelley et al. | | 713/184 |
| 2003/0088785 A1 * | 5/2003 | Fujiwara et al. | | 713/191 |
| 2004/0139288 A1 * | 7/2004 | Perego et al. | | 711/154 |
| 2005/0180572 A1 * | 8/2005 | Graunke | | 380/277 |
| 2005/0210280 A1 * | 9/2005 | Paatero | | 713/200 |
| 2006/0050876 A1 * | 3/2006 | Courtel | | 380/44 |
| 2006/0136751 A1 * | 6/2006 | Bonaccio et al. | | 713/194 |
| 2006/0177064 A1 * | 8/2006 | Holtzman et al. | | 380/277 |
| 2006/0195901 A1 * | 8/2006 | Kelley et al. | | 726/18 |
| 2006/0210082 A1 | 9/2006 | Devadas et al. | | |
| 2006/0271793 A1 | 11/2006 | Devadas et al. | | |

(Continued)

FOREIGN PATENT DOCUMENTS

WO WO-2005/041000 A1 5/2005

*Primary Examiner*—James H. Cho
*Assistant Examiner*—Matthew C Tabler
(74) *Attorney, Agent, or Firm*—Dickstein, Shapiro, LLP.

(57) ABSTRACT

An integrated circuit including a digital key provider comprising an output and an enable-input, wherein the digital key provider is configured to provide the digital key at the output only when an enable-signal is provided to the enable-input; and a fuse unit comprising a first fuse and a second fuse, wherein the fuse unit is configured to provide the enable-signal to the enable-input when the first fuse is broken while the second fuse is intact.

17 Claims, 4 Drawing Sheets

U.S. PATENT DOCUMENTS

| | | | |
|---|---|---|---|
| 2007/0172053 A1* | 7/2007 | Poirier | 380/28 |
| 2007/0223704 A1* | 9/2007 | Brickell et al. | 380/281 |
| 2007/0226806 A1* | 9/2007 | Tung et al. | 726/27 |
| 2007/0241768 A1* | 10/2007 | Erickson et al. | 326/8 |
| 2007/0247182 A1* | 10/2007 | Beatty et al. | 326/8 |

* cited by examiner

| fuse 1 | fuse 2 | RFID status |
|---|---|---|
| not broken | not broken | key not accessible |
| broken | not broken | key is accessible |
| broken | broken | key is not accessible |
| not broken | broken | key is not accessible |

FIG 2A

| fuse 1 | fuse 2 | RFID status |
|---|---|---|
| not broken | not broken | key not accessible |
| not broken | broken | key is accessible |
| broken | broken | key is not accessible |
| broken | not broken | key is not accessible |

FIG 2B

INTEGRATED CIRCUIT AND METHOD FOR PREVENTING AN UNAUTHORIZED ACCESS TO A DIGITAL VALUE

BACKGROUND

Exemplary embodiments relate to an integrated circuit and a method for preventing an unauthorized access to a digital value.

SUMMARY

Exemplary embodiments relate to an integrated circuit comprising a means for providing a digital key and a fuse means. The means for providing the digital key comprises an output for the digital key and an enable-input, wherein the means for providing is configured to provide the digital key at the output merely in the case an enable-signal is provided to the enable-input. The fuse means comprises a first fuse and a second fuse, wherein the fuse means is configured to provide the enable-signal to the enable-input in case the first fuse is broken while the second fuse is intact.

BRIEF DESCRIPTION OF SEVERAL VIEWS OF THE DRAWINGS

Features of exemplary embodiments will more readily appreciated and better understood by reference to the following detailed description, which should be considered with reference to the accompanying drawings, in which:

FIGS. 2a and 2b show possibilities for accessing a key depending on the status of a fuse 1 and a fuse 2;

Figure 1:
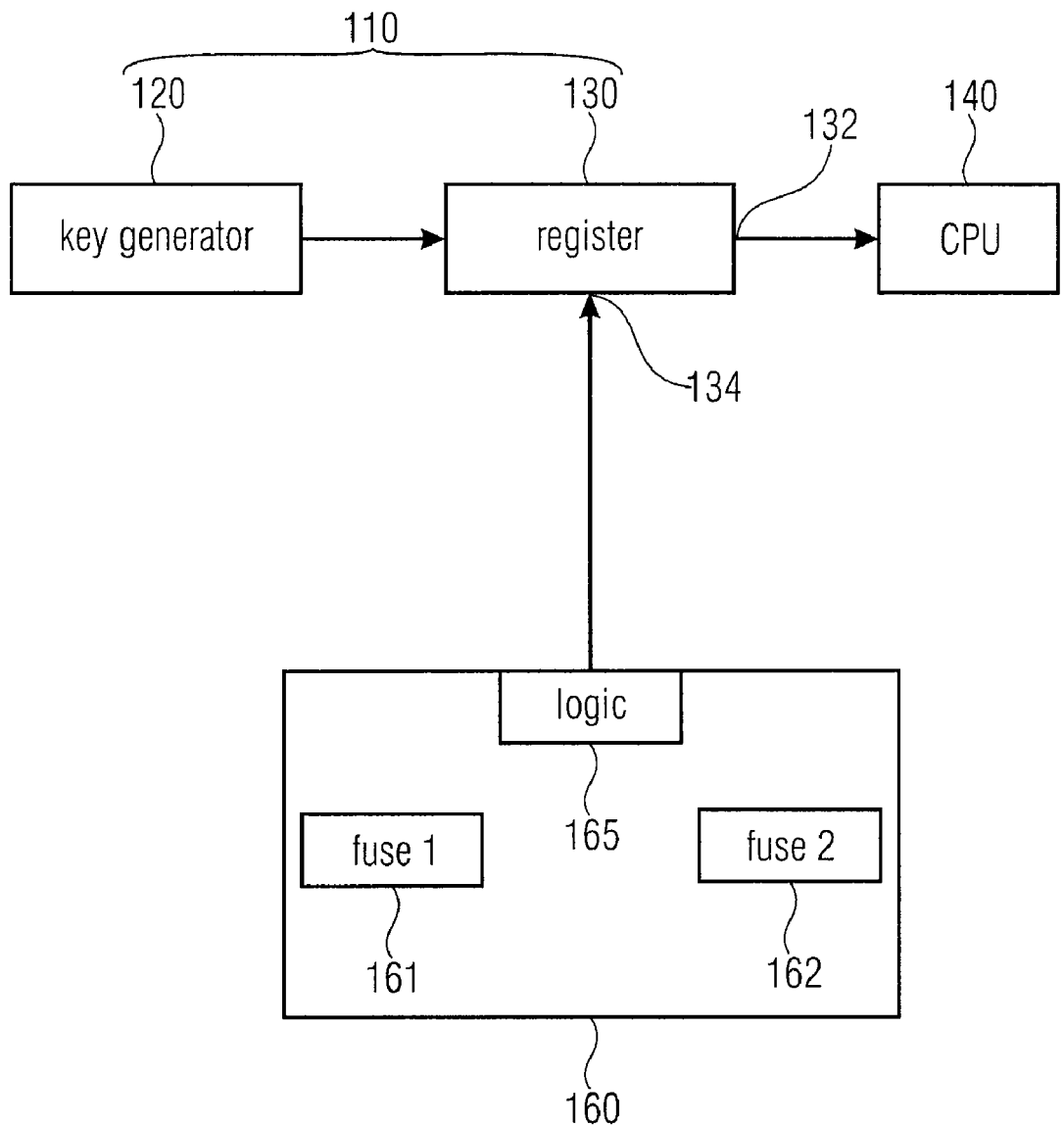
FIG. 1 shows a schematic view on an exemplary embodiment.

Before exemplary embodiments will be explained in more detail below with reference to the drawings, it is to be noted that equal elements or those operating in an equal way are provided with the same or similar reference numerals in the figures and that a repeated description of these elements is omitted.

DETAILED DESCRIPTION

Identification devices as, for example, RFID chips (RFID=Radio Frequency Identification) may be used for identifying the owner of a chip or product to which the chip is connected. For this purpose the identification devices can employ a secret key mutual authentication protocol, wherein a physical uncloneable function (PUF) may be used as a key generator. The physical uncloneable function comprises, for example, a circuit which exploits chip-to-chip process variations and generates on the fly a volatile chip individual key.

The PUF offers a unique and unpredictable way of mapping challenges to responses (=the uncloneable function), although different PUFs may have been manufactured by the same process and may comprise the same devices. The uncloneability property is related to unavoidable manufacturing variations so that each device differs from another device in their electric characteristics. In silicon PUFs for example, the switching delays of transistors may deviate from each other, so that a simple time measurement for a signal propagating along different paths may differ from PUP to PUF in an unpredictable way. The manufacturing tolerances as, for example, layer thickness, doping levels, geometrical distances, etc. are namely controllable only up to a certain accuracy. For example, there are no two transistors, whose threshold voltages are exactly the same. Due to this unpredictability, every PUF comprises its own challenge-response authentication.

A PUF-generated secret key guarantees therefore a higher security against cloning than a key programmed in a non-volatile memory because tampering attempts will destroy the key.

However, since the customer (personalizer) is not able to program its own key (which he could keep secret), the problem of reading out the key arises. The read out process of the key should of course guarantee at the same time that during the whole device lifetime, the key is not compromised. In addition, the chip manufacturer should not be involved in the process, thus reducing logistic costs (e.g. for a secure transport) and avoiding legal obligations (such as responsibility for a compromised key).

Therefore, there is a need of managing the life cycle of identification devices based on a secret-key mutual authentication protocol. This may in particular be needed for identification devices such as RFIDs.

If the RFID comprises a non-volatile memory (as for example a ROM), the customer can program its own secret key during personalization and store it, for example, in the non-volatile memory. The disadvantage is, however, that this procedure provides a lower protection against cloning when compared to a PUF-based key generation. In addition, the customer should keep the key a secret, which cannot always be ensured. As explained above, the PUF-based key generation does not need to store the key in a memory, but instead generates a unique key due to its unique challenge-response function. This avoids the lack in security.

Embodiments provide a method for life-cycle management of PUF-based identification devices, which employs two fuses to protect the readout of the secret key. Embodiments, therefore, provide an integrated circuit, which comprises a means for providing a digital key and a fuse means. The means for providing the digital key comprises an output for the digital key and an enable input, wherein the means for providing the digital key is configured to provide the digital key at the output merely in case an enable signal is provided to the enable input. The fuse means comprises a first and second fuse and is configured to provide the enable signal to the enable input in case the first fuse is broken while the second fuse is intact. Alternatively, the fuse means may be configured to provide the enable signal to the enable input in case the second fuse is broken while the first fuse is intact.

Hence, in exemplary embodiments of the application an integrated circuit integrates two fuses, which are not broken when the device with the integrated circuit leaves the manufacturer. During this phase or state, the secret key (=output of the PUF circuitry) cannot be accessed. Therefore, the manufacturer does not know the key and the chip can be transferred to the customer using an insecure channel.

For testing purposes, the manufacturer can run the authentication protocol several times with the same challenge, checking that always the same response is generated. This is sufficient to test the stability of the key or the stability of the key generation (stability over time, environmental conditions, etc.).

Embodiments may use the following way of personalizing. The customer (personalizer) checks at first the status of the first fuse and if the first fuse is broken, the key is compromised and the device is not further processed. The device becomes useless and hence can be discarded. If the first fuse is unbroken, successively the second fuse is checked and if the second fuse is broken, the key cannot be accessed and the device is not processed further. Also in this case, the device is useless and hence discarded.

If both fuses are intact or not broken, the personalizer brakes the first fuse, thus making the key accessible. The key is then read out and stored in a database. After this, the personalizer breaks the second fuse, thus making the key permanently inaccessible. These three steps (breaking the first fuse, reading out the key, breaking the second fuse) are the only operations, which should be performed in a secure environment.

In the field (insecure environment), a reader may connect the key database through an authentication channel, and authenticate the RFID with a standard authentication protocol. Since a reader has access to the database, the authentication can be based on the shared secret key. For example, in the process of authentication, the database can provide a challenge to the RFID chip, which generates a response using the secret key (e.g. performs an encryption) and returns the response to the database, which may finally analyze the response of the RFID chip and infers from the response, whether the correct secret key has been used in generating the response implying that the authentication was successful (valid). In this authentication procedure there is no need to exchange the secret key, which thus remains protected.

Advantages of exemplary embodiments are, therefore, that on one hand the PUF circuitry can be used as a key generator and on the other hand that the generated key cannot be read out from the device. This is especially useful for devices such as RFID chips. In addition, no non-volatile memory is needed on the identification device and, therefore, there is also no risk that this memory can be read out by an unauthorized user. At the same time, embodiments can use the high security provided by PUF-circuitries, which makes it a simple and easy to use device for identification, especially for RFID chips.

Moreover, a secure environment is only needed for the process of personalization, in which the key is read out and stored in a database. But there are no higher security measures needed in the process of manufacturing, shipping or the handling by the user.

FIG. 1 shows a schematic view of an exemplary embodiment comprising a means for providing a digital key 110, wherein the means for providing 110 comprises a key generator 120 and a register or key register 130. The register 130 comprises an output 132 for the digital key, which is provided by the key generator 120, and an enable input 134. The means for providing 110 is configured to provide the digital key at the output 132 merely in case an enable signal is provided to the enable input 134. Moreover, the integrated circuit comprises a fuse means 160 comprising a first fuse 161 and a second fuse 162, wherein the fuse means 160 is configured to provide the enable signal to the enable input 134 in case the first fuse 161 is broken while the second fuse 162 is intact. The output of the enable signal to the enable input 134 may, for example, be provided by a logic 165.

In further embodiments the first fuse 161 and the second fuse 162 may also be interchanged so that for providing the enable signal to the enable input 134, it may only be sufficient that one fuse of the two fuses is broken while the other fuse is intact. Therefore, the fuse means 160 comprises three states, a first state in which both fuses are broken, a second state in which both fuses are intact and a third state in which one of the two fuses is broken and only in the last state the digital key of the key generator 120 can be read out from the identification device and can be provided to a central processor unit 140 (CPU). The CPU 140 can then forward the key to a database, in which the key is stored in a secure environment.

Hence, the concept of embodiments offers a method to manage the life cycle of an identification device (as, for example, RFID), integrating, for example, a PUF as a key generator. The three states may be related to different phases of the life cycle of the identification device. The first state corresponds to the phase of manufacturing and distributing (both fuses should not be broken). The second state corresponds to the phase of personalization and storing the secret key (only one fuse is broken). The third state is used within the user environment, in which both fuses are broken so that it is impossible to read out the key again later on.

FIGS. 2a and 2b show the different possibilities for breaking the fuses and the resulting RFID status. In FIG. 2a, a first possibility is shown, wherein the key is accessible only in the case when fuse 1 (=first fuse 161) is broken and fuse 2 (=second fuse 162) is not broken. The other cases where both, the fuse 1 and the fuse 2 are broken or both are unbroken, the key cannot be accessed on the RFID chip. In the example of FIG. 2a, the case where the fuse 1 is not broken, whereas fuse 2 is broken, results in an RFID status, wherein the key cannot be accessed.

FIG. 2b shows an alternative configuration, wherein the key can be accessed if fuse 1 is not broken whereas fuse 2 is broken and in all other cases, the key is not accessible.

Therefore, FIGS. 2a and 2b are complimentary with each other in the sense that fuse 1 and fuse 2 are interchanged. For the application the key becomes accessible if one of the two fuses is broken, whereas it is inaccessible if both fuses or no fuse is broken.

Figure 3:
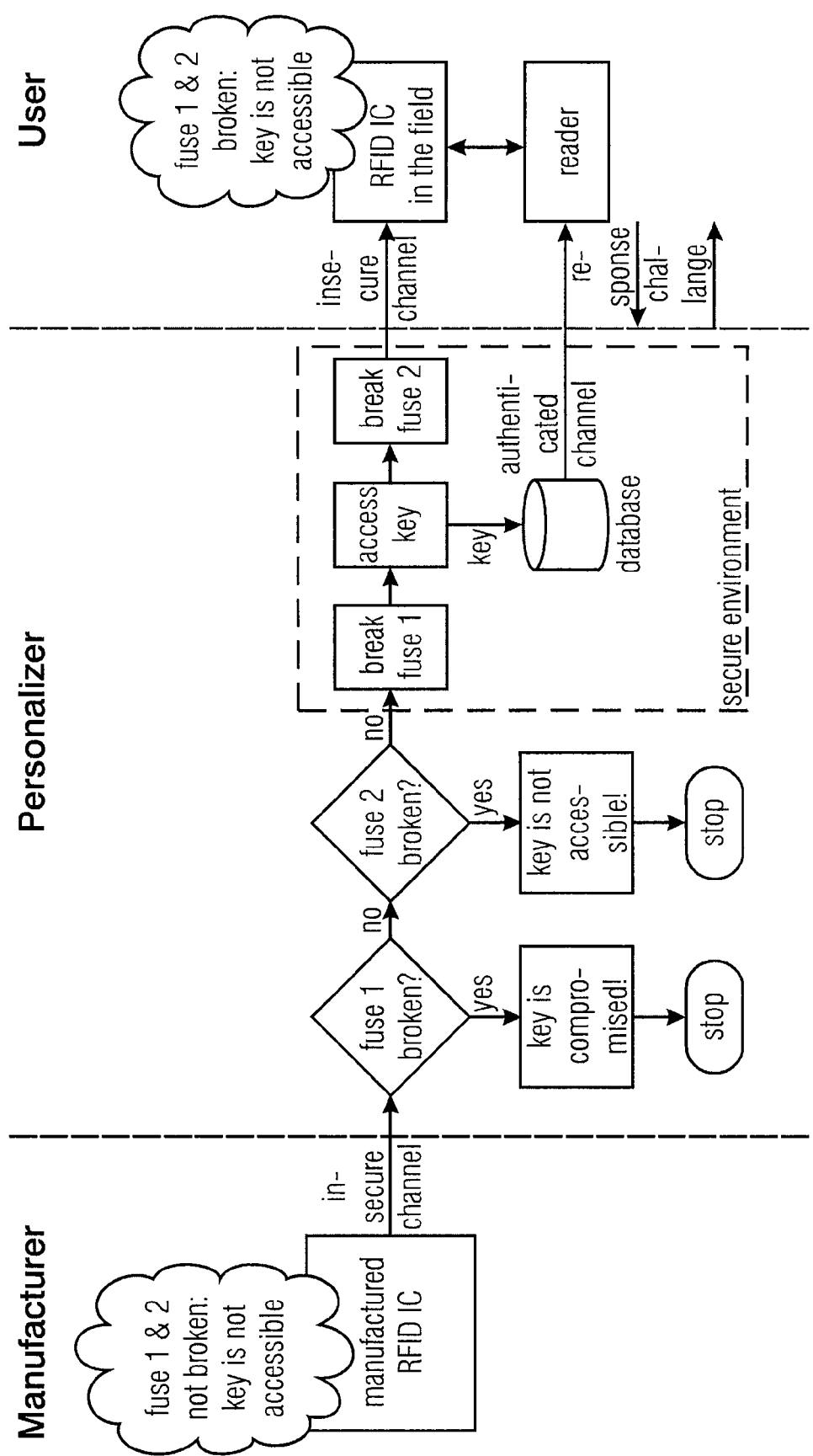
FIG. 3 shows a process for accessing a key on an RFID circuit according to embodiments.

FIG. 3 shows the phases of the life cycle of the identification device, which comprises the three cases, wherein in the first case the identification key is manufactured and distributed. In this case both fuses (fuse 1 and fuse 2) should not be broken and, hence, the key is not accessible. In this phase, the identification key can be processed over insecure channels and no security measures are necessary. In the second phase—the personalizer—it is needed to ensure first that both fuses are unbroken. For example, in a first step, it is checked as to whether fuse 1 is broken and in case it is broken, the key is compromised and the identification chip is useless. If the fuse 1 is not broken, a subsequent second step will check as to whether fuse 2 is broken. In case fuse 2 is broken, the key is also not accessible and the identification chip is again useless.

In case the second fuse is also unbroken (so that both are intact), the personalizer will within a secure environment break fuse 1 and subsequently access the key. After reading out the key, the key can be stored on a database and after that fuse 2 will also be broken. After this step, the identification chip can again be transferred into an insecure channel because another access of the key will not be possible.

In the third phase, a user can use the identification chip (for example, the RFID-IC) in the field without maintaining a secure environment. Since fuse 1 and fuse 2 are broken, the key is not accessible. If a reader now reads the RFID chip, the reader can access the database over an authentication channel and perform the authentication of the RFID chip. The authentication comprises, for example, a specific challenge, which should be responded by the RFID chip by a key-dependent response that can be transmitted back to the database. The database can compare the key-dependent response with the expected key-dependent response, which is generated by using the stored secret key. Thus, only if the correct secret key is used to generate the response from the challenge, the expected response is obtained.

Figure 4:
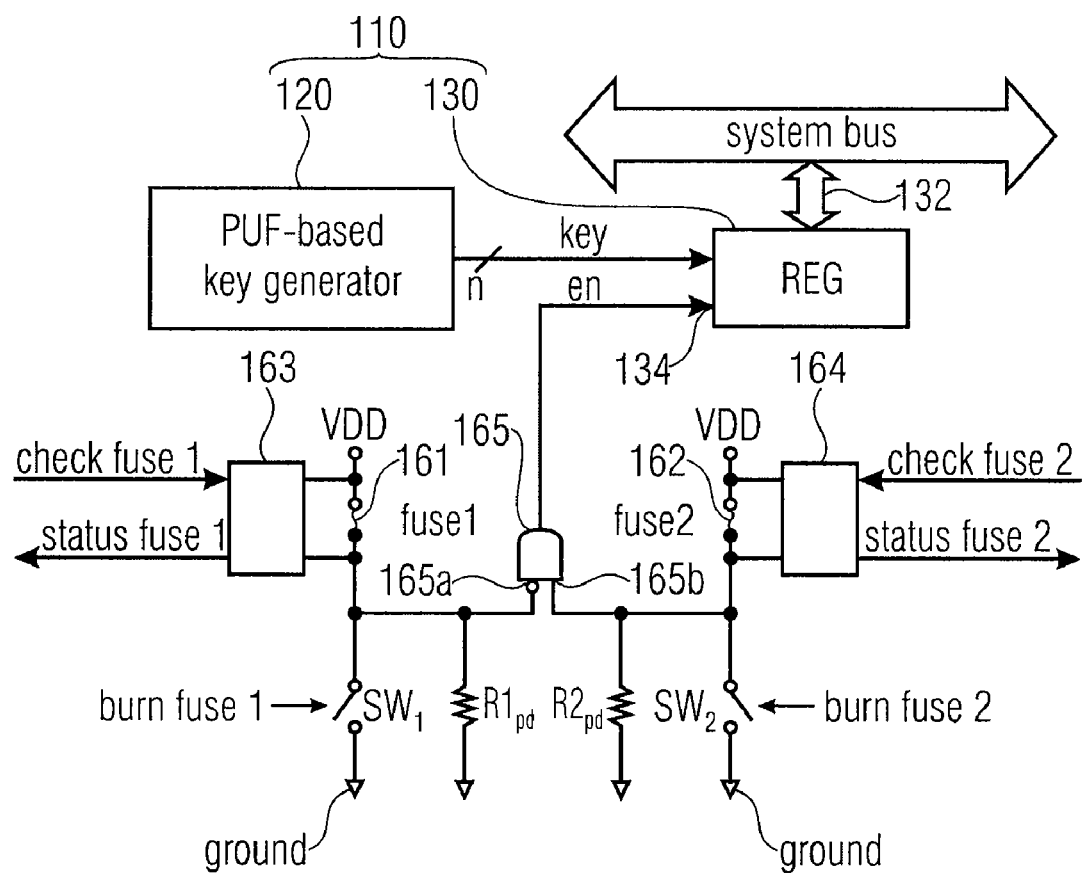
FIG. 4 shows an example for a circuitry to implement the key access according to embodiments.

FIG. 4 shows a circuitry implementing an exemplary embodiment. The means for providing 110 comprises a PUF-based key generator 120 and the register 130, wherein the PUF-based key generator 120 is operable to provide a digital key to the register 130. The register 130 comprises an output 132 and an enable input 134, wherein the register 130 is configured to provide the digital key to the system bus when an enable signal is provided to the enable input 134.

The fuse means 160 comprises a logic 165, which comprises an output connected to the enable input 134 of the register 130. The logic 165 comprises in addition two inputs, a first input 165a and a second input 165b, wherein in this embodiment the first input 165a is inverted and the logic 165 is of AND-type (in further embodiments the second input 165b is inverted instead of the first input 165a). The first input 165a is connected to a voltage supply VDD via the first fuse 161 (fuse 1). In addition, a first switch SW1 is connected between the first input 165a of the logic 165 and a ground terminal (GROUND) and a first pull down resistor $R1_{pd}$ is connected in parallel to the first fuse 161, i.e. between the ground terminal and the first input 165a of the logic 165. The second fuse 162 (fuse 2) is connected between the voltage supply VDD and the second input 165b of the logic 165. Moreover, a second switch SW2 is connected between the second input 165b of the logic 165 and a ground terminal and a second pull-down resistor $R2_{pd}$ is connected in parallel to the second switch SW2, i.e. between the second input 165b of the logic 165 and ground. The second switch SW2 is, along with the fuse 162, serially connected between voltage supply potential VDD and ground to enable—when being closed—burning the second fuse 162 (fuse 2). Similarly, the first switch SW1 forms a serial connection with the first fuse 161 between VDD and ground to enable burning the first fuse 161. Thus, switches SW1 and SW2 form means for burning the fuses 161 and 162, respectively.

Moreover, a first means for checking the fuse 163 is connected in parallel to the first fuse 161, i.e. on one hand to the voltage supply VDD and on the other hand to the first input 165a. The first means for checking 163 is, for example, configured to check a voltage drop over the first fuse 161 (fuse 1). The first means for checking 163 comprises an input that is configured to accept a check fuse 1-signal and a status output that is configured to provide a status of the fuse 1. In case the fuse 1 is intact or broken, a corresponding signal (true or false) is provided to the status output of the first means for checking the first fuse 163.

A second means for checking the fuse 164 is connected in parallel to the second fuse 162, i.e. it is connected on one hand to the voltage supply VDD and on the other hand to the second input 165b of the logic 165. The second means for checking the fuse 164 is configured to check the status of the second fuse 162, for example, by measuring a voltage drop over the second fuse 162 (fuse 2) in order to obtain the status of the second fuse 162 (broken or unbroken). The second means for checking 164 comprises an input and a status output, wherein the input is configured to accept a check fuse 2-signal, and the status output is configured to provide a status (broken or intact) of the fuse 2.

In above embodiments, fuses were used as the first and second fuse elements 161, 162. Thus, in the above embodiments, the intact state of the above fuse elements was a conductive state whereas the broken state, reachable from the intact state by an irreversible (braking) process, was an isolated state. However, the opposite is possible as well. That is, anti-fuses may be used as the fuse elements so that the intact state is an isolative state whereas the broken state, reachable from the intact state by an irreversible (braking) process, is an conductive state.

In the embodiment for the circuitry as shown in FIG. 4, an enable signal is provided to the enable input 134 of the register 130 when at the first input 165a, the voltage VDD is applied, whereas at the second input 165b, ground is applied. Therefore, if both fuses, the first fuse 161 and the second fuse 162 are intact, the first and second input 165a,b of the logic 165 are isolated from the VDD voltage.

In order to access the key in the register 130 during the process of personalization, the first fuse 161 will be broken. As explained above, breaking the fuse 1 or 2 can be done by temporary switching on SW1 or SW2 respectively. Thus, ground is applied to the first input 165a, whereas VDD voltage is still applied to the second input 165b, because the second fuse remains closed.

As a result, the logic 165 provides the enable signal (e.g. a logic true) so that the register 130 allows reading out the key obtained from the key generator 120 to a system bus. After reading out the key, the second fuse 162 will also be broken. The ground is thus applied to the second input 165b of the logic 165, so that the output of the logic 165 is always false and it is not possible anymore to read out the key from the register 130 again.

In the above embodiments, breaking the fuses is, for example, done in an irreversible way by burning a conductive path so that an electrical continuity is interrupted, which cannot be restored anymore.

Therefore, FIG. 4 provides an implementation of an exemplary embodiment, in which the enable signal for key register 130 is controlled by the status of two fuses. In addition, means for checking the fuse status is available (a first means 163 and a second means 164). Note, this implementation refers to the table of FIG. 2a, whereas it is obvious in order to implement the table shown in FIG. 2b, instead of inverting the signal at the second input 165b of the logic 165, the signal at the first input 165a should be inverted (effectively interchanging the first with the second input of the logic 165). In further embodiments a parallel connection of two logics (with different inverted inputs) can be formed so that it is sufficient to break one of two fuses without identifying which one.

What is claimed is:

1. An integrated circuit comprising:
    a digital key provider comprising an output and an enable-input, wherein the digital key provider is configured to provide the digital key at the output only when an enable-signal is provided to the enable-input; and
    a fuse unit comprising a first fuse and a second fuse, wherein the fuse unit is configured to provide the enable-signal to the enable-input when the first fuse is broken and the second fuse is intact,
    wherein the fuse unit comprises a first fuse checking device configured to check the status of the first fuse and a second fuse checking device configured to check the status of the second fuse.

2. The integrated circuit of claim 1, wherein the digital key provider comprises a key generator and a register, and wherein the register comprises the enable input and the output.

3. The integrated circuit of claim 2, wherein the key generator comprises a physically uncloneable function-circuit.

4. The integrated circuit of claim 1, further comprising a central processor unit comprising an input for the digital key provided by the output.

5. The integrated circuit of claim 1, wherein the fuse unit comprises an AND-gate and a logic inverter, the logic inverter being coupled between the first fuse and an input of the AND-gate.

6. An integrated circuit comprising:
- a first fuse device being convertible from a non-broken to a broken state;
- a second fuse device being convertible from a non-broken to a broken state;
- a physical uncloneable function circuitry;
- a central processor unit;
- a register being activable by an enable signal announcing an enable state to render a digital value from the physical uncloneable function circuitry available in the central processor unit; and
- a logic gate configured to logically combine electrical states depending on the first fuse device and the second fuse device such that the logic sets the enable signal to an enable state merely when one of the first fuse device and the second fuse device is in the unbroken state and sets the enable signal into a disable state when either both the first and the second fuse device are in the unbroken state or when both the first and the second fuse device are in the broken state.

7. The integrated circuit of claim 6, further comprising a first fuse status checking device configured to analyze the status of the first fuse and to generate a status signal.

8. The integrated circuit of claim 6, further comprising a second fuse status checking device configured to analyze the status of the second fuse device and to generate a status signal.

9. The integrated circuit of claim 6, further comprising a first and second pull-down resistor, wherein the first pull-down resistor is coupled between a first input of the logic gate and ground and the second pull-down resistor is coupled between the second input of the logic gate and ground.

10. The integrated circuit of claim 6, further comprising a first and second switch, wherein the first switch is coupled between a first input of the logic gate and ground and the second switch is coupled between the second input of the logic gate and ground,
wherein the first switch is configured to open if the first fuse is converted from the non-broken to the broken state and wherein the second switch is configured to open if the second fuse is converted from the non-broken to the broken state.

11. The integrated circuit of claim 6, wherein the first or second fuse comprises an isolating layer, and wherein the first or second fuse is configured to burn the isolation layer such that the non-broken state is converted into the broken state so that an electrical connection is established.

12. An RFID-device comprising:
the integrated circuit of claim 1.

13. A method for preventing an unauthorized access to a digital value, comprising:
- checking the status of the first or the second fuse to determine whether the first or the second fuse is in a non-broken state or in a broken state;
- providing a digital key to a register;
- enabling the register by an enable signal, wherein the register is configured to provide the digital key to an output merely when the enable signal is provided to an enable input;
- breaking a first fuse to generate the enable signal to enable the register; and
- breaking a second fuse to disable the register.

14. The method of claim 13, wherein the step of breaking the first fuse comprises burning an isolation layer such that an electric connection along the first fuse is established.

15. A method for manufacturing an integrated circuit comprising:
- forming a first fuse device being convertible from a non-broken to a broken state;
- forming a second fuse device being convertible from a non-broken to a broken state;
- forming a physical uncloneable function circuitry;
- forming a register being activable by an enable signal announcing an enable state to render a digital value from the physical uncloneable function circuitry available in a central processor unit; and
- forming a logic gate, which is configured to logically combine electrical states depending on the first fuse device and the second fuse device such that the logic gate sets the enable signal to the enable state merely when one of the first and second fuse devices is in the unbroken state and sets the enable signal into an disable state when either both the first and second fuse device are in the unbroken state or both the first and the second fuse device are in the broken state.

16. The method of claim 15, wherein forming the first and second fuse devices are performed such that both, the first and second fuse devices are in the non-broken state.

17. An integrated circuit comprising:
- a means for providing a digital key at an output merely when an enable-signal is provided to an enable-input; and
- a fuse means, comprising a first fuse and a second fuse, for providing the enable-signal to the enable-input when the first fuse is broken while the second fuse is intact.

* * * * *